United States Patent
An et al.

(10) Patent No.: US 9,276,879 B2
(45) Date of Patent: *Mar. 1, 2016

(54) MEMORY TRANSFER OPTIMIZATION OF NETWORK ADAPTER DATA PLACEMENT WHEN PERFORMING HEADER-DATA SPLIT OPERATIONS

(71) Applicant: International Business Machines Corporation, Armonk, NY (US)

(72) Inventors: Jiandi A. An, Round Rock, TX (US); James B. Cunningham, Austin, TX (US); Herman D. Dierks, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/078,633

(22) Filed: Nov. 13, 2013

(65) Prior Publication Data

US 2015/0085880 A1 Mar. 26, 2015

Related U.S. Application Data

(63) Continuation of application No. 14/036,191, filed on Sep. 25, 2013.

(51) Int. Cl.
| | | |
|---|---|---|
| H04L 12/861 | (2013.01) | |
| H04L 12/879 | (2013.01) | |
| H04L 29/06 | (2006.01) | |

(52) U.S. Cl.
CPC .............. *H04L 49/901* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 5,274,768 | A | * | 12/1993 | Traw et al. ................... 709/236 |
| 5,355,504 | A | | 10/1994 | Nedwek |
| 5,491,802 | A | | 2/1996 | Thompson et al. |
| 5,757,804 | A | * | 5/1998 | McGee ......................... 370/510 |
| 7,512,128 | B2 | * | 3/2009 | DiMambro et al. .......... 370/393 |

(Continued)

FOREIGN PATENT DOCUMENTS

EP    0 572 145 A2    12/1993

OTHER PUBLICATIONS

U.S. Appl. No. 14/036,191, printed Nov. 8, 2013, 1 page.

(Continued)

*Primary Examiner* — Omar Ghowrwal
*Assistant Examiner* — Angel Brockman
(74) *Attorney, Agent, or Firm* — Stephen J. Walder, Jr.; Thomas E. Tyson

(57) ABSTRACT

Mechanisms are provided, in a data processing system comprising a host system and a network adapter, for processing received frames of data over a network connection. The mechanisms receive, in the host system from the network adapter, a plurality of frames of data. The mechanisms record, by the host system, for each frame in the plurality of frames, a header size associated with the frame over a current predetermined interval. The mechanisms determine, by the host system, a receive buffer address offset for receive buffers in the host system for a next predetermined interval based on the recorded header sizes of the plurality of frames over the current predetermined interval. In addition, the mechanisms configure, by the host system, the network adapter to utilize the receive buffer address offset to perform data transfers with the host system.

10 Claims, 8 Drawing Sheets

(56) References Cited

U.S. PATENT DOCUMENTS

| | | |
|---|---|---|
| 8,571,014 B2 | 10/2013 | Joergensen et al. |
| 2004/0125750 A1 | 7/2004 | Katti et al. |
| 2006/0104268 A1 | 5/2006 | Lee et al. |
| 2006/0221951 A1 | 10/2006 | Basso et al. |
| 2007/0147491 A1 | 6/2007 | Casper et al. |
| 2007/0195761 A1* | 8/2007 | Tatar et al. .................... 370/389 |
| 2009/0119437 A1 | 5/2009 | Hilscher |
| 2009/0310572 A1 | 12/2009 | Wang et al. |
| 2011/0200051 A1 | 8/2011 | Rivaud et al. |
| 2015/0085880 A1 | 3/2015 | An et al. |

OTHER PUBLICATIONS

IBM, et al., "Ethernet Adapter with Split of Header and Payload", An IP.com Prior Art Database Technical Disclosure; http://ip.com/IPCOM/000144118D; Dec. 18, 2006, 8 pages.

Shah, H et al., "Direct Data Placement over Reliable Transports (RFC5041)", Internet Society et al., An IP.com Prior Art Database Technical Disclosure, http://ip.com/IPCOM/000159869D, Nov. 1, 2007, 40 pages.

* cited by examiner

MEMORY TRANSFER OPTIMIZATION OF NETWORK ADAPTER DATA PLACEMENT WHEN PERFORMING HEADER-DATA SPLIT OPERATIONS

This application is a continuation of application Ser. No. 14/036,191, filed Sep. 25, 2013, status pending.

BACKGROUND

The present application relates generally to an improved data processing apparatus and method and more specifically to mechanisms for performing memory transfer optimization of network adapter data placement when performing header-data split operations.

Network data traffic is normally comprised of data frames which are prepended by protocol headers. Protocol headers provide information required by different protocol layers to properly process data frames as they move through the network fabric. In order to provide greater optimization, a network service provider, such as an Ethernet adapter or other network adapter, may implement a header-data split function so that the data and protocol headers can be placed in separate host memory locations. This allows separate processing of the headers from the data, or payload, of the frames.

Network adapters supporting receive path header-data split do so by performing separate and distinct Direct Memory Access (DMA) write operations to host memory. In known header-data split operations, one DMA write operation contains only the frame headers which are placed in host memory location A, which is reserved for the frame header, and subsequent DMA write operation(s) to write the frame data (or payload) in other host memory location(s) B, C, D, etc., which are reserved for the frame data.

FIG. 1 is a diagram of a known header-data split architecture that utilizes the Network Driver Interface Specification (NDIS). As shown in FIG. 1, a Network Interface Card (NIC) 110 and NDIS protocol engine 120 are provided. The NIC 110 comprises a miniport adapter driver 130 and header-data split provider 140. The miniport adapter driver 130 receives configuration information from NDIS protocol engine 120 to set up the NIC 110 for header-data split receive operations. In addition, the miniport adapter driver 130 exposes the NIC 110 services to NDIS protocol engine 120 for runtime operations such as send and receive operations.

The NIC 110, configured for header-data split operations, receives Ethernet frames and splits the headers and data into separate receive buffers. The miniport adapter driver 130 uses NDIS receive function to indicate the received data to the NDIS protocol engine 120 and also assigns a NET_BUFFER structure to a NET_BUFFER_LIST structure when indicating received data. For header-data split, the NET_BUFFER structures in the receive indications split the received Ethernet frame by using separate memory descriptor lists (MDLs) for the header and the data. In addition, the NET_BUFFER_LIST structure contains header-data split information in the NET_BUFFER_LIST information.

FIG. 2 is an example diagram illustrating a received frame, split buffers, and a memory layout of the header buffers in accordance with known header-data split architectures. As shown in FIG. 2, the received frame 210 comprises a header 212 and a data portion 214 (or payload). The frame 210 is split to generate split frame 220 in which the header 212 of the frame 210 is separated and stored in a header buffer 222 and the data 214 or payload is stored in one or more data buffers 224. As shown in FIG. 2, the header buffers 222 may be provided in a contiguous block of storage in a header memory portion 230 of host memory. The data buffers 224 for storing the data 214 need not be in a contiguous block of storage of a data memory portion 240.

SUMMARY

In one illustrative embodiment, a method, in a data processing system comprising a host system and a network adapter, for processing received frames of data over a network connection. The method comprises receiving, in the host system from the network adapter, a plurality of frames of data. The method further comprises recording, by the host system, for each frame in the plurality of frames, a header size associated with the frame over a current predetermined interval. Moreover, the method comprises determining, by the host system, a receive buffer address offset for receive buffers in the host system for a next predetermined interval based on the recorded header sizes of the plurality of frames over the current predetermined interval. In addition, the method comprises configuring, by the host system, the network adapter to utilize the receive buffer address offset to perform data transfers with the host system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As mentioned above, many modern network adapters, or Network Interface Cards (NICs), are able to support receive path header-data split functionality. However, some network adapters supporting receive path header-data split are implemented in a manner that provides sub-optimal performance in the case where receive path header-data split is not desired or is not supported by the host operating system. In such a case, the network adapter, which has not been configured in the host operating system to perform receive path header-data split, continues to perform header-data split, but simply places the data or payload in host memory such that the data immediately follows the frame headers. From an observational perspective, header-data split functionality appears to be disabled, however the network adapter is still performing separate Direct Memory Access (DMA) writes to the host memory, since the network adapter still is performing DMA writes as if header-data split were still being performed.

This behavior of the network adapter has negative performance consequences due to the fact that the initial DMA write containing the packet header will typically end on a non-cache-aligned boundary in host memory. Moreover, the subsequent DMA write(s) containing the packet data will typically begin on a non-cache-aligned boundary in host memory. As a result, the host system must perform a read-modify-write (RMW) operation for each partial cache line write in order to maintain memory coherency. For example, if a cache line is 128 bytes in size and a first DMA write is performed to write the header data to the cache line, which is 60 bytes in size, this DMA write operation will result in a RMW operation because it is a partial cache line write operation. Furthermore, the subsequent DMA write, to write data from the payload of the frame to the cache line, will begin at a non-cache aligned boundary of 128-60=68 bytes, resulting in another RWM operation on the same cache line. This can especially be an issue when the header/payload of a frame may have variable size from frame to frame such that it is not assured where the header and payload data are within the cache line.

Figure 1:
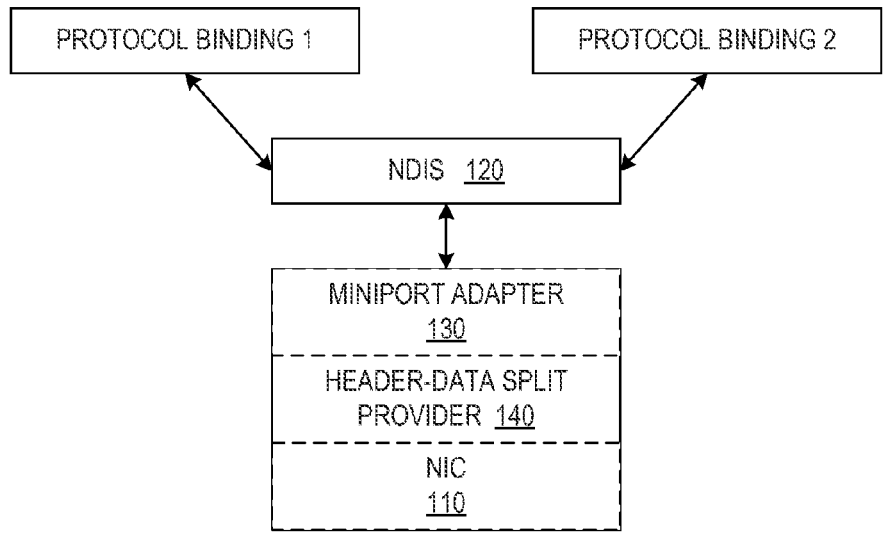
FIG. 1 is a diagram of a known header-data split architecture that utilizes the Network Driver Interface Specification (NDIS)
Figure 2:
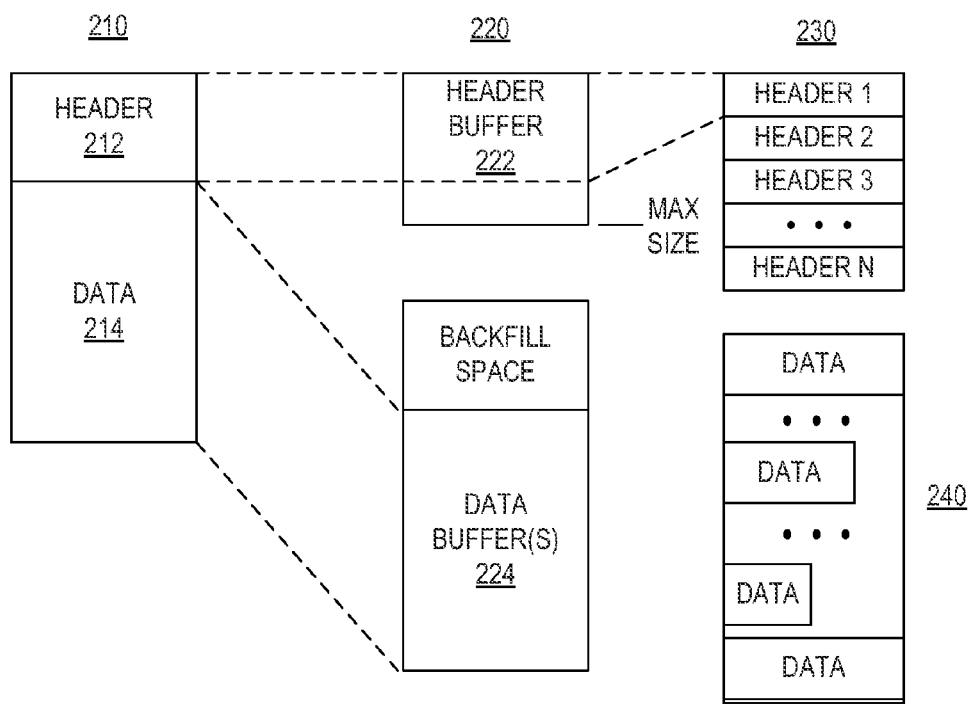
FIG. 2 is an example diagram illustrating a received frame, split buffers, and a memory layout of the header buffers in accordance with known header-data split architectures.
Figure 3A:
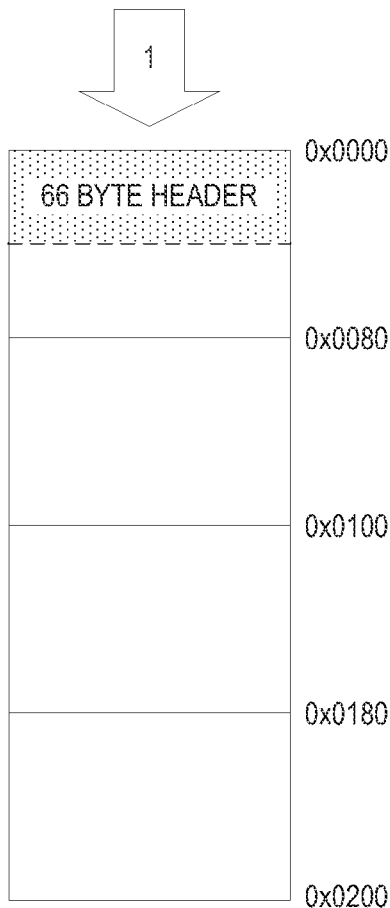
FIG. 3A illustrates the operation performed by the network adapter, when performing header-data split operations, for performing a DMA write of the packet header.
Figure 3B:
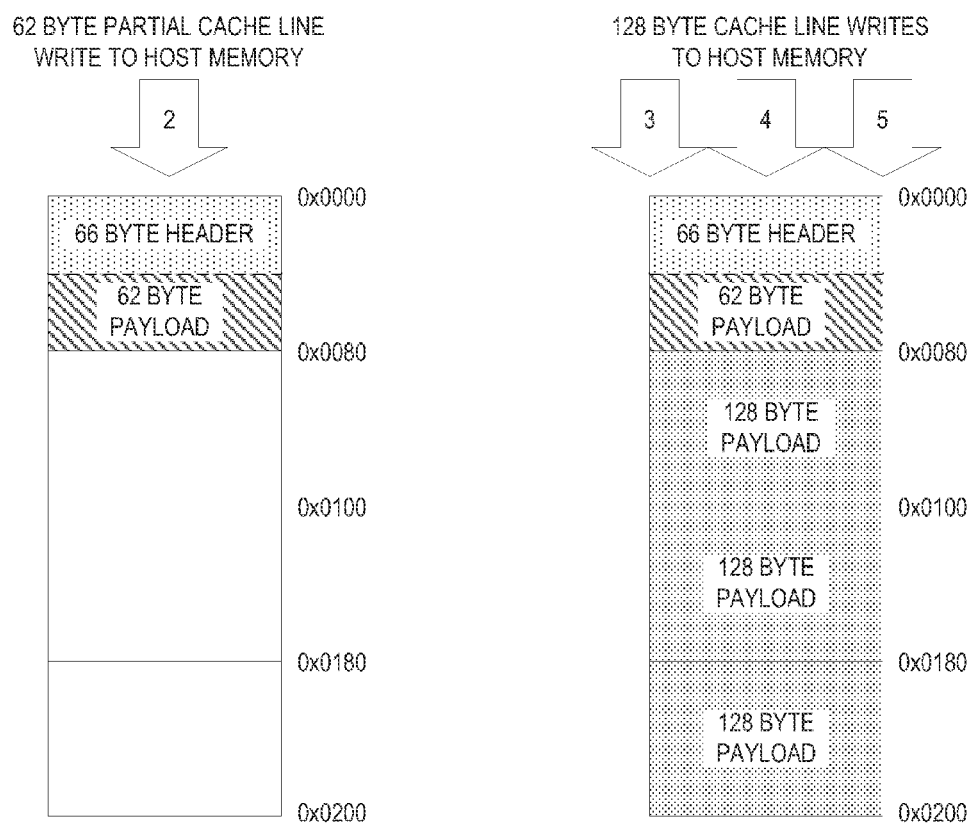
FIG. 3B illustrates the operation performed by the network adapter when performing header-data split operations, for performing a DMA write of the packet payload.

To further illustrate the problems with the known header-data split mechanisms, consider the example shown in FIGS. 3A and 3B. In the example shown in FIGS. 3A and 3B, it is assumed that a frame is received with a 66 byte packet header and 800 byte packet payload and that the cache line size for the host memory is 128 bytes. It is further assumed for this example that receive-path header-data split functionality is disabled by the host system. FIG. 3A illustrates the operation performed by the network adapter, when performing receive path header-data split operations, for performing a DMA write of the packet header. FIG. 3B illustrates the operation performed by the network adapter when performing receive path header-data split operations, for performing a DMA write of the packet payload.

As shown in FIG. 3A, in an initial step, the network adapter performs a DMA write, containing only the packet header (66 bytes in this example), to starting address 0x0000. This requires that the host system perform a partial cache line write to host memory because the DMA write contains less than 128 bytes (one cache line) of data. Partial cache line writes require a Read-Modify-Write (RMW) operation in order to correctly update the contents of the host memory.

As shown in FIG. 3B, in a subsequent second step, the network adapter performs a DMA write of 800 bytes containing the packet payload. Because the receive path header-data split is disabled by the host system, the network adapter begins the DMA write of the packet payload at the address immediately following the packet header. Because this is a new DMA write operation which does not start on a cache line boundary, the host system must perform a partial cache line write of the first 62 bytes of the packet payload (128 byte cache line−66 byte packet header=62 bytes of packet payload to fill cache line) to the host memory using a RMW operation. After this initial partial cache line write of 62 bytes is completed, the host system continues to place the remaining packet payload into host memory (third through fifth steps). These subsequent writes are full cache line writes and therefore do not require the host to perform a RMW operation. It should be noted, however, that there may be a final partial cache line write required at the end of the packet payload, depending on whether the end of the data terminates on a cache line boundary or not.

The need to perform partial cache line writes and the RMW operations causes extra overhead associated with performing DMA writes to host memory when a network adapter is configured to perform header-data split operations and the host system disables such functionality. There are multiple possible solutions to this issue. First, the network adapter firmware or hardware may be redesigned to fully disable receive header-data split when requested. However, this solution may not be practical or possible due to the time involved in performing the redesign, the costs involved to implement the redesign, or network adapter vendors may simply not agree to make such redesign.

Another possible solution is to redesign the host system platform to reduce or eliminate the performance impact of partial cache line writes (read-modify-write operations) on DMA write operations. However, this solution may not be practical or possible due to the lead time and development resources required to pursue this solution.

Another possible solution is to provide a fixed starting DMA address offset for each host receive buffer such that the frame payload starting address is on a cache line boundary. While this solution is easy to implement, it suffers from one major limitation in that if the receive traffic characteristics are such that the frame header size varies from frame to frame, the supplied DMA address offset will not always result in properly aligned frame payloads. That is, if the header of a first frame is 60 bytes and the fixed offset is 68 bytes (cache line size of 128 minus 60 bytes), then a properly cache line boundary aligned write may be performed. However, if the next frame has a header size of 54 bytes, then write of the payload data will begin at byte 123 (fixed offset 68 bytes plus 54 bytes=122 bytes), which is not properly aligned at the cache line boundary assuming a cache line size of 128 bytes.

Still another possible solution is to redesign the network adapter firmware or hardware to insert pad bytes between the headers and payload data such that the payload data begins on a cache-aligned boundary. However, this solution requires the host operating system to be aware of pad byte insertion and appropriately handle this behavior. This may be problematic for host operating systems that are not originally designed to handle this behavior and thus, may require changes to the host operating system which requires development and test resources that raise the cost and lead-time of the solution.

The illustrative embodiments provide a mechanism for performing memory transfer optimization of network adapter data placement when performing header-data split operations. The mechanisms of the illustrative embodiments provide a solution to the above issues that may be implemented entirely within the adapter device driver rather than requiring costly changes to the host operating system, network adapter firmware, or the like. There are no required changes to the network adapter hardware, network adapter firmware, host operating system, or host system hardware with the mechanisms of the illustrative embodiments. As a result, the solution presented by the illustrative embodiments is, relatively speaking, quicker to implement and less costly to implement as compared to the other alternatives described above.

The illustrative embodiments, rather than providing a fixed DMA address offset for each host receive buffer, instead provides mechanisms in the host operating system to calculate a starting receive buffer DMA address offset based on an analysis of incoming receive frames. Such analysis may be performed on a continuous or periodic basis. In particular, the host operating system monitors the received frames to determine the most frequently occurring header size for frames over a predetermined interval. This most frequently occurring header size is selected in order to calculate the receive buffer DMA address offset for the next series of frames for the next predetermined interval.

For example, as each receive frame is processed by the host operating system, the frame's header size is determined and recorded. At a periodic interval, which may be measured as a predetermined number of frames received or a predetermined elapsed time, e.g., number of processor cycles or the like, the host operating system determines a receive frame header size corresponding to the most frequent occurrence of header size in the frames received during the interval. Based on the calculated header size, determined based on the most frequently occurring header size over the predetermined interval, the host operating system calculates a DMA address offset value which will result in the receive frame data payload starting at a cache line boundary. The DMA address offset value is then added to the starting DMA address of all receive buffers that are supplied to the network adapter during the subsequent interval.

This implementation of a proposed solution to the non-cache-aligned boundary issues discussed above, in conjunction with network adapters supporting multiple receive queues, results in even greater operational efficiency since receive network traffic associated with a given connection will tend to hash to the same receive queue and as a result, the receive packet header sizes will tend to have less variance on a given queue. Moreover, the host operating system is able to perform receive packet header size analysis and optimal DMA address offset determination on a queue-by-queue basis, also resulting in greater offset accuracy.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
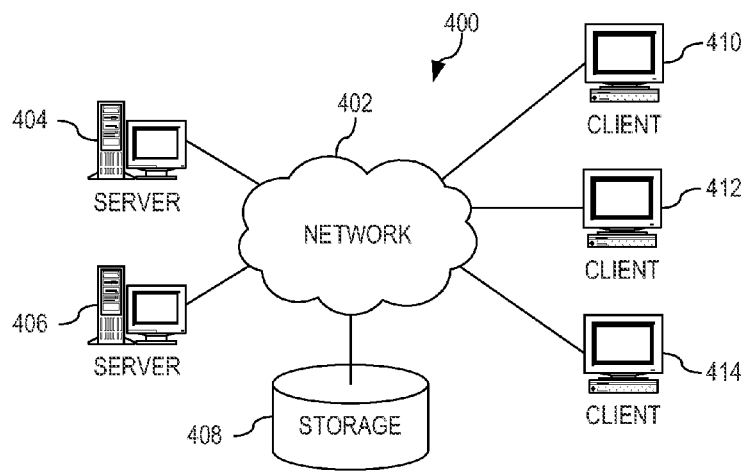
FIG. 4 depicts a pictorial representation of an example distributed data processing system in which aspects of the illustrative embodiments may be implemented.
Figure 5:
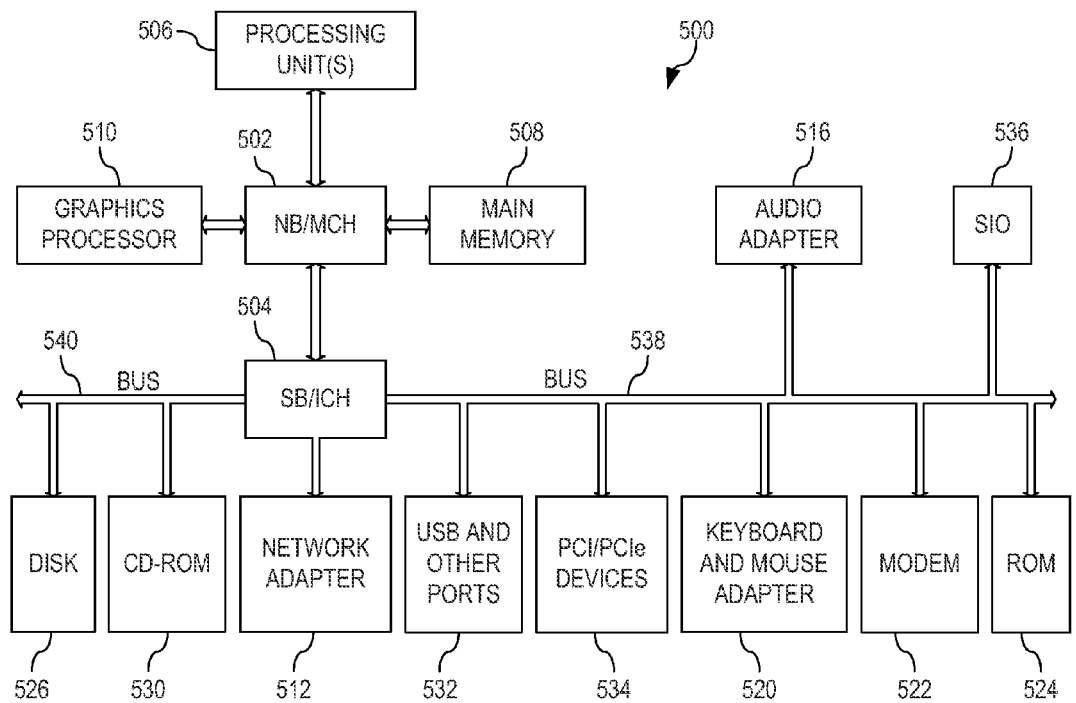
FIG. 5 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 4 and 5 are provided hereafter as example environments in which aspects of the illustrative embodiments may be implemented. It should be appreciated that FIGS. 4 and 5 are only examples and are not intended to assert or imply any limitation with regard to the environments in which aspects or embodiments of the present invention may be implemented. Many modifications to the depicted environments may be made without departing from the spirit and scope of the present invention.

FIG. 4 depicts a pictorial representation of an example distributed data processing system in which aspects of the illustrative embodiments may be implemented. Distributed data processing system 400 may include a network of computers in which aspects of the illustrative embodiments may be implemented. The distributed data processing system 400 contains at least one network 402, which is the medium used to provide communication links between various devices and computers connected together within distributed data processing system 400. The network 402 may include connections, such as wire, wireless communication links, or fiber optic cables.

In the depicted example, server 404 and server 406 are connected to network 402 along with storage unit 408. In addition, clients 410, 412, and 414 are also connected to network 402. These clients 410, 412, and 414 may be, for example, personal computers, network computers, or the like. In the depicted example, server 404 provides data, such as boot files, operating system images, and applications to the clients 410, 412, and 414. Clients 410, 412, and 414 are clients to server 404 in the depicted example. Distributed data processing system 400 may include additional servers, clients, and other devices not shown.

In the depicted example, distributed data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 400 may also be implemented to include a number of different types of networks, such as for example, an intranet, a local area network (LAN), a wide area network (WAN), or the like. As stated above, FIG. 4 is intended as an example, not as an architectural limitation for different embodiments of the present invention, and therefore, the particular elements shown in FIG. 4 should not be considered limiting with regard to the environments in which the illustrative embodiments of the present invention may be implemented.

FIG. 5 is a block diagram of an example data processing system in which aspects of the illustrative embodiments may be implemented. Data processing system 500 is an example of a computer, such as client 410 in FIG. 4, in which computer usable code or instructions implementing the processes for illustrative embodiments of the present invention may be located.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 may be connected to SB/ICH 504.

An operating system runs on processing unit 506. The operating system coordinates and provides control of various components within the data processing system 500 in FIG. 5. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 500.

As a server, data processing system 500 may be, for example, an IBM® eServer™ System p® computer system, running the Advanced Interactive Executive (AIX®) operating system or the LINUX® operating system. Data processing system 400 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for illustrative embodiments of the present invention may be performed by processing unit 506 using computer usable program code, which may be located in a memory such as, for example, main memory 508, ROM 524, or in one or more peripheral devices 526 and 530, for example.

A bus system, such as bus 538 or bus 540 as shown in FIG. 5, may be comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, may include one or more devices used to transmit and receive data. A memory may be, for example, main memory 508, ROM 524, or a cache such as found in NB/MCH 502 in FIG. 5.

Those of ordinary skill in the art will appreciate that the hardware in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

In accordance with one illustrative embodiment, the host operating system executing on one or more of the processing units 506 is expanded to include logic for monitoring, recording, and analyzing received frame header sizes and calculating a DMA address offset value based on the results of the analysis of the recorded frame header sizes for a predefined interval. For example, the logic may be provided in a network adapter device driver or other operating system level code that is used to communicate with a network adapter 512. The logic of the network adapter device driver monitors received frames for a predetermined interval and records, in a data structure associated with the network adapter device driver, the header size of the received frames, finds the header size that is most frequently occurring in frames received during the interval, calculates a DMA address offset for receive buffers based on the most frequently occurring header size for the frames during the interval, and initializes the network adapter to utilize host receive buffer DMA addresses that correspond to the host receive buffer DMA address, supplied by the host operating system or application, plus the calculated DMA address offset. This processing may be performed continuously or periodically for later intervals with the DMA address offset being dynamically updated as necessary when the DMA address offset is calculated to be different from a previous DMA address offset used by the network adapter.

The network adapter 512 may or may not support multiple receive queues for establishing multiple communication connections with other devices via one or more data networks. If the network adapter 512 supports multiple receive queues, then the host operating system may perform operations of the illustrative embodiments for determining a DMA address offset for each receive queue separately, e.g., the network adapter device driver comprises logic for performing its operations with regard to multiple receive queues of the network adapter 512. With a network adapter 512 that supports multiple receive queues, the network adapter device driver may not supply separate receive buffers for separate data communication streams, e.g., two or more Transmission Control Protocol (TCP) streams, and instead merely posts receive buffers for the network adapter 512 as a whole for the network adapter 512 to utilize. In such a case, the network adapter 512 may utilize a hashing technique and hashing logic to place the frames of different communication streams in different receive queues, with frames from the same data communication stream being hashed to the same receive queue. As such, by performing the operations of the present invention on separate receive queues separately, a more accurate identification of a DMA address offset for each data communication stream is made possible.

Figure 6:
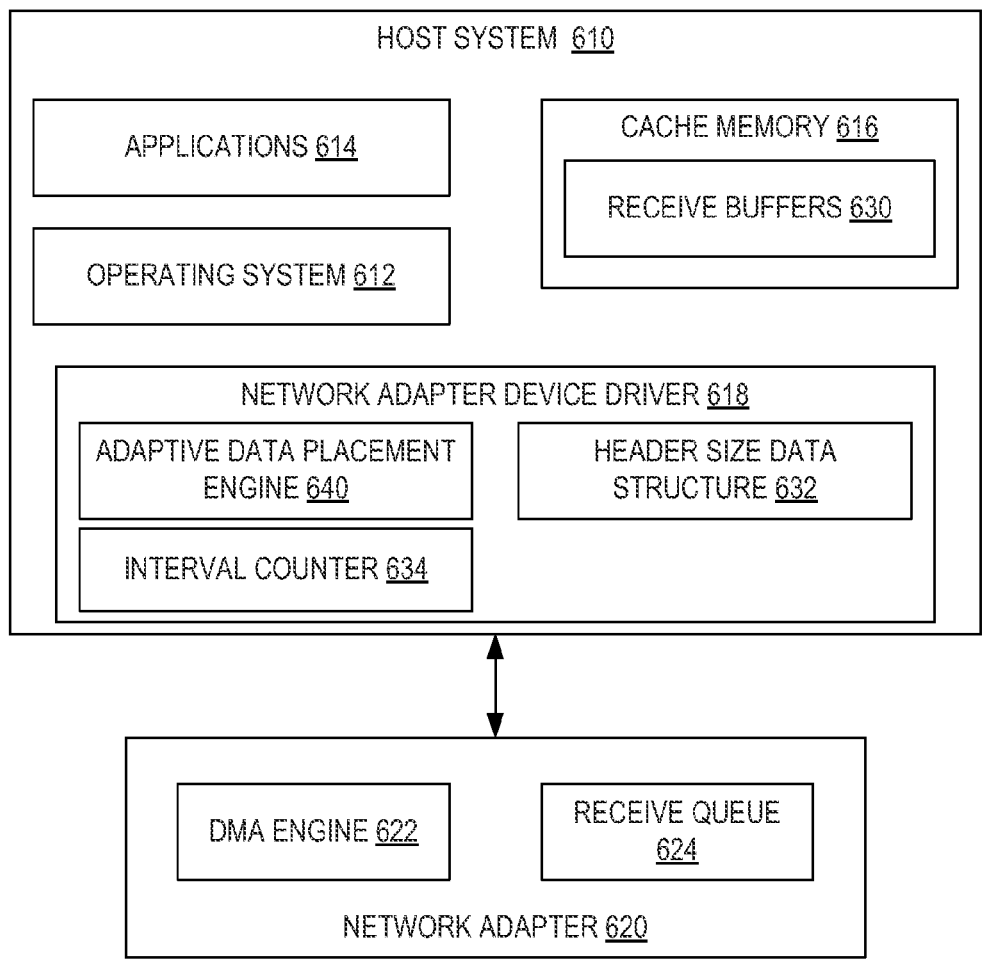
FIG. 6 is an example block diagram of the primary operational elements for implementing memory transfer optimization of network adapter data placement when performing header-data split operations.

FIG. 6 is an example block diagram of the primary operational elements for implementing memory transfer optimization of network adapter data placement when performing header-data split operations. The mechanisms shown in FIG. 6 may be implemented in software, hardware, or any combination of software and hardware. Software elements in FIG. 6 represent instructions executed by one or more hardware devices such that the functionality of the software elements may be realized. In accordance with one illustrative embodiment, the host operating system mechanisms and device driver mechanisms may be implemented as software instructions executed on one or more processors of one or more data processing systems/devices in conjunction with cache and/or system memory. In such an example embodiment, the network adapter mechanisms in FIG. 6 may be implemented in hardware, firmware, or as software executed on one or more processors of the network adapter.

As shown in FIG. 6, the primary operation elements in accordance with one illustrative embodiment comprise a host system 610 and a network adapter 620. The host system 610 executes an operating system 612 through which applications 614 may execute and communicate data to/from hardware devices, such as the network adapter 620. To facilitate such data communication, the application 614 requests access to the network adapter 620 and the operating system 612 establishes send and receive buffers 630 in cache memory 616 for sending/receiving data. The operating system 612 communicates the allocation of send and/or receive buffers 630 to the network adapter 620, and specifically a Direct Memory Access (DMA) engine 622 of the network adapter 620 so that the network adapter 620 knows where to DMA data into the cache memory 616.

The network adapter device driver 618 is used by the operating system 612 to communicate both commands and data to/from the network adapter 620. In accordance with the illustrative embodiments, the network adapter device driver 618 is configured with adaptive data placement engine 640 for monitoring frames of data transferred from the network adapter 620 to the receive buffers 630 registered with the network adapter 620 for the particular application 614 of interest. The monitoring of the frames comprises the identification of the header size of the received frame and determining if a header size object for the identified header size already was created in a header size data structure 632 associated with the network adapter device driver 618. If a header size object already exists for the identified header size in the header size data structure 632, a counter associated with the header size object may be updated to indicate the reception of another frame with that header size, e.g., the counter is incremented. If a header size object for the identified header size of the received frame does not already exist in the header size data structure 632, a new header size object is created and an associated counter is incremented accordingly. Thus, during an interval, counters associated with header size objects in the header size data structure 632 are incremented as new frames are received into the receive buffers that have the corresponding header size.

It should be appreciated that a set of header size objects may be maintained in the header size data structure 632 for each receive queue of the network adapter 620. Alternatively, a separate header size data structure 632 may be created for each receive queue 624 of the network adapter 620. There may be multiple receive queues 624 in the network adapter 620 which are hashed by the DMA engine 622 so as to place the received data in a corresponding set of receive buffers 630 of the cache memory 616.

A separate interval counter 634 may be maintained by the network adapter device driver 618 for counting a number of elements for defining an interval of interest, e.g., a number of processor cycles or other measure of time, a number of received frames, or the like. For example, in one illustrative embodiment, as frames for a particular queue are received, the corresponding interval counter 634 is incremented. There may be separate interval counters 634 for each queue. In response to the value of the interval counter 634 being equal to a predetermined threshold value, e.g., a maximum number of frames per interval, the counters associated with the header size objects in the header size data structure 632 for the queue may be reset.

In response to the value of the interval counter 634 equaling the predetermined threshold value, the network adapter device driver 618 analyzes the header size objects in the header size object data structure 632 for the queue and determines which header size object has the largest counter value. The corresponding header size object having the largest counter value is selected as the most frequently occurring header size object for the interval and is then used by the network adapter device driver 618 to calculate a DMA address offset for the subsequent interval. If more than one of the header size objects have corresponding counters with the same counter values at the end of the interval, one is selected either arbitrarily or semi-arbitrarily. What is meant by semi-arbitrarily is that various decision logic may be implemented to select a header size object and if none of the conditions of this logic are satisfied, then an arbitrary selection may be performed.

For example, a first determination may be made as to whether the header size object was selected in one or more previous intervals (a header size object history data structure may be maintained to make such determinations). Selection of a header size object that was previously selected for a previous interval may be preferred since it is likely that for a data communication connection, a same header size as was previously used is more likely than not. If such a situation is not present, then an arbitrary selection may be utilized.

In another illustrative embodiment, a most recently received header size may be selected from among the header size objects having similar counter values. In such a case, timestamp data may be stored in association with the header size objects to store the timestamp of the receipt of the last frame having the corresponding header size. Other logic for looking at historical selections of header size objects, looking at conditions of a data communication connection, or the like, may be used to select between similarly frequent header size objects without departing from the spirit and scope of the illustrative embodiments. Of course, any combination of such logic may be used as well without departing from the spirit and scope of the illustrative embodiments.

Once a header size object is selected, the corresponding header size value of the header size object is used by the network adapter device driver 618 to calculate a DMA address offset so as to align future data payloads of received frames to a cache line boundary. For example, assume that a header size object is selected from the header size object data structure 632 that has a header size value of 66 bytes (0x42). Assume also that the host system 610 cache line size is 128 bytes (0x80). A corresponding DMA address offset may be calculated as 0x80-0x42=0x3E. Thus, the DMA address offset may be calculated as the difference of the cache line size and the header size value of the selected header size object, which corresponds to the most frequently occurring header size found in received frames during a predetermined interval.

Having calculated a DMA address offset for the receive buffers 630 of the cache memory 616, the network adapter device driver 618 initializes network adapter receive descriptors of the network adapter 620 using the newly calculated DMA address offset added to the host receive buffer DMA addresses. For example, if the host receive buffer DMA address is 0x80000000, using the example DMA address offset above of 0x3E, the address used in the receive descriptor of the network adapter 620 is 0x8000003E. The receive descriptor is a data structure that the host system 610 used to define the receive buffers 630, in the cache memory, to the network adapter 620 such that the DMA engine of the network adapter may make proper use of the receive buffers 630. Thus, with the mechanisms of the illustrative embodiments, the receive descriptor of a set of receive buffers for a receive queue of the network adapter 620 may be dynamically updated with each subsequent interval based on the most frequently occurring header size identified by the network adapter device driver 618 during the interval.

Figure 7A:
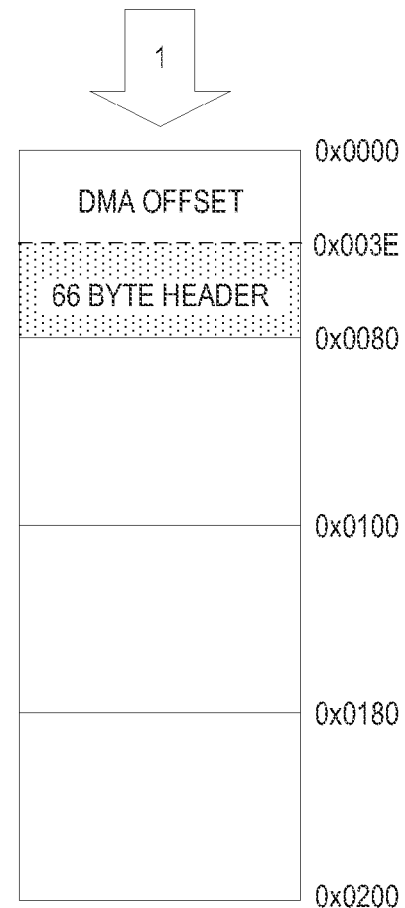
FIG. 7A illustrates the header DMA write operation performed as part of handling of a received frame after having determined a DMA address offset based on a most frequently occurring frame header size in a previous interval in accordance with one illustrative embodiment.
Figure 7B:
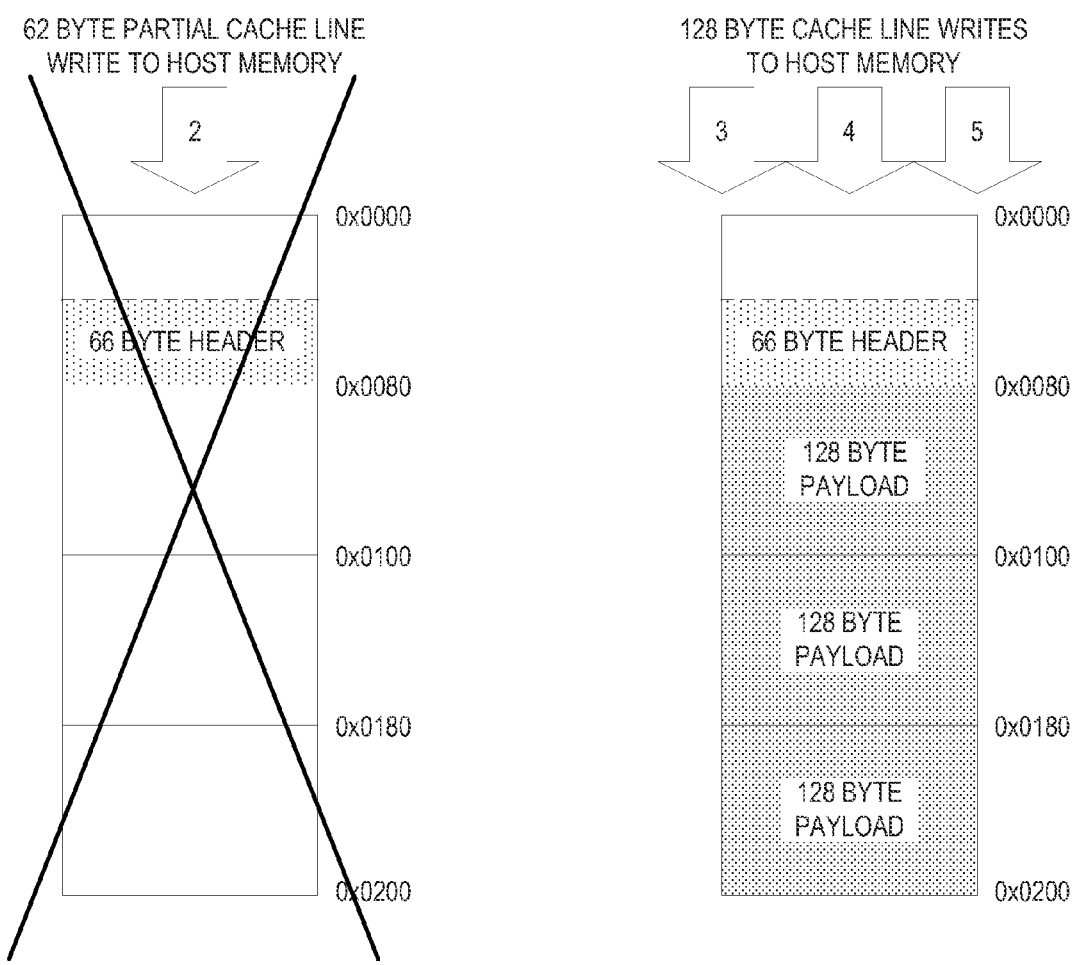
FIG. 7B illustrates the payload DMA write operations performed as part of handling of a received frame after having determined a DMA address offset based on a most frequently occurring frame header size in a previous interval in accordance with one illustrative embodiment.

To illustrate the manner by which the DMA address offset is used to handle a frame received during a next interval after having determined this DMA address offset, consider the example shown in FIGS. 7A and 7B. The example shown in FIGS. 7A and 7B corresponds to the example shown in FIGS. 3A and 3B to illustrate the differences in the handling of the frames under the mechanisms of the illustrative embodiments as opposed to the mechanisms implemented in the description of FIGS. 3A and 3B. FIG. 7A illustrates the header DMA write operation performed as part of handling of a received frame after having determined a DMA address offset based on a most frequently occurring frame header size in a previous interval in accordance with one illustrative embodiment. FIG. 7B illustrates the payload DMA write operations performed as part of handling of a received frame after having determined a DMA address offset based on a most frequently occurring frame header size in a previous interval in accordance with one illustrative embodiment. In the depicted example, it is assumed that during a previous interval, the mechanisms of the illustrative embodiments have selected a most frequently occurring header size that corresponds to a DMA address offset of 62 (0x3E) bytes (DMA address offset=cache line size minus most frequently occurring header size, i.e. 128-66=62.

As shown in FIG. 7A, in a first step of the handling of the frame using header-data split functionality and the mechanisms of the illustrative embodiments, the network adapter performs a DMA write containing only the frame header (66 bytes in this example) to a starting address 0x0000+(128-66)=0x003E. This requires the host system to perform a partial cache line write to host memory because the write operation contains less than 128 bytes (one cache line) of data. As a result, a Read-Modify-Write (RMW) operation is used to correctly update the contents of the host memory. It should be noted, however, that because of the DMA address offset determined from the previous interval's most frequently occurring frame header size, the frame header written by the network adapter now terminates on a cache line boundary, i.e. 0x0080.

As shown in FIG. 7B, because the network adapters DMA write operation results in the frame header being aligned with the cache line boundary, the partial cache line write that would have been required when initially writing the frame payload is avoided, e.g., step 2 in FIG. 3B. Thus, all of the DMA write operations for writing the frame payload may contain a full cache line of data. That is, when the network adapter performs a DMA write of the 800 bytes containing the frame payload, because the receive path header-data split functionality has been disabled by the host operating system, the network adapter begins the DMA write at the address immediately following the frame header. Due to the proper offset of the frame header which results in the frame header ending on a cache line boundary, the header payload DMA write begins on a cache line boundary and therefore, enables the host system to avoid the partial cache line write that was previously required in the example of FIG. 3B. Thus, the mechanisms of the illustrative embodiments enable cache aligned data transfers of frames between a network adapter and a host system even when the network adapter performs header-data split operations and the host operating system has disabled such functionality.

Figure 8:
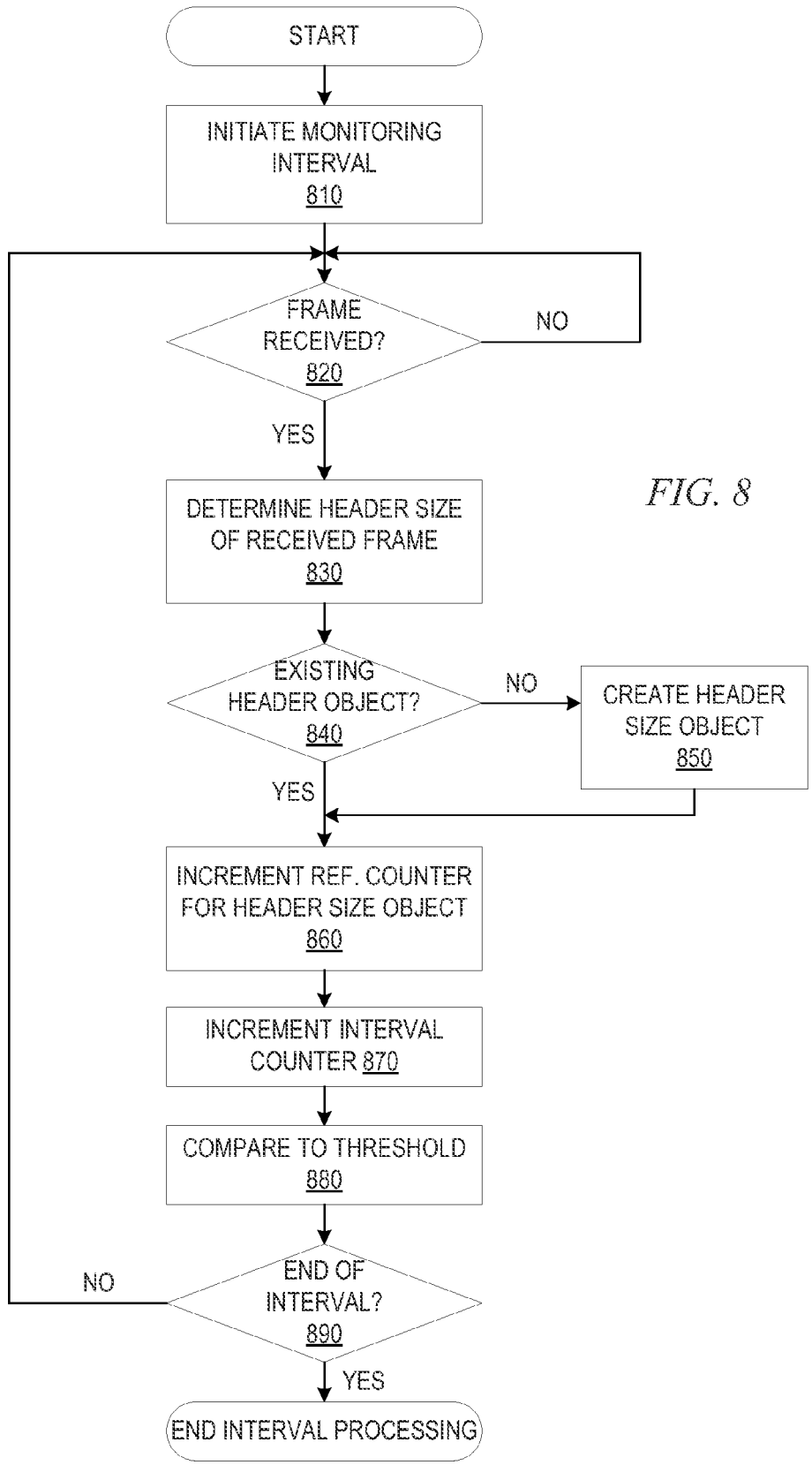
FIG. 8 is a flowchart outlining an example operation for network adapter device driver monitoring of header size for frames received within a predetermined interval in accordance with one illustrative embodiment.

FIG. 8 is a flowchart outlining an example operation for network adapter device driver monitoring of header size for frames received within a predetermined interval in accordance with one illustrative embodiment. The example outlined in FIG. 8 is based on an interval defined by a number of frames received. It should be appreciated that modifications to the example outlined in FIG. 8 may be made to accommodate other types of interval definitions, including numbers of processor cycles, time measurements, or the like.

As shown in FIG. 8, the operation starts by initiating a monitoring interval (step 810). A determination is made as to whether a frame is received (step 820). If not, the operation returns to step 820 until a frame is received. If a frame is received, the header size of the received frame is determined (step 830). This determination can be made in a number of different ways depending on the capability of the network adapter. In one illustrative embodiment, the network adapter may include the receive frame header size value within a Receive Completion Descriptor for that frame. If this is the case, the network adapter device driver can obtain the frame header length value from the frame's Receive Completion Descriptor. For other network adapters that do not include this information in the Receive Completion Descriptor, the network adapter device driver may perform an inspection of the frame in order to calculate the header size value. There are software algorithms which the network adapter device driver may use to determine the Ethernet (Layer 2) header size, the IP (Layer 3) header size, and the TCP (Layer 4) header size, etc. This is referred to as packet header parsing.

A determination is made as to whether a header size object already exists in a corresponding header size data structure (step 840). If not, a header size object is created in the header size data structure, where the header size object comprises an identification of the header size and a reference counter for counting a number of frames received having the corresponding header size within the interval (step 850). The header size object may comprise other information that may be used for performing the operations of the illustrative embodiments, e.g., a timestamp of a last received frame with the corresponding header size, or the like.

Thereafter, or if a header size object already exists in the header size data structure in step 840, the reference counter associated with the header size object corresponding to the header size of the received data frame is incremented (step 860). In addition, an interval counter is incremented for having received another frame within the interval (step 870). The interval counter value is compared to a threshold number of frames per interval (step 880) and a determination is made as to whether the interval counter value is equal to the threshold or not (step 890). If so, then the interval has ended and the operation proceeds to an end of interval processing operation, such as outlined in FIG. 9, for example. If the end of the interval has not been reached, i.e. the interval counter value does not equal the threshold number of frames per interval, then the operation returns to step 820.

Figure 9:
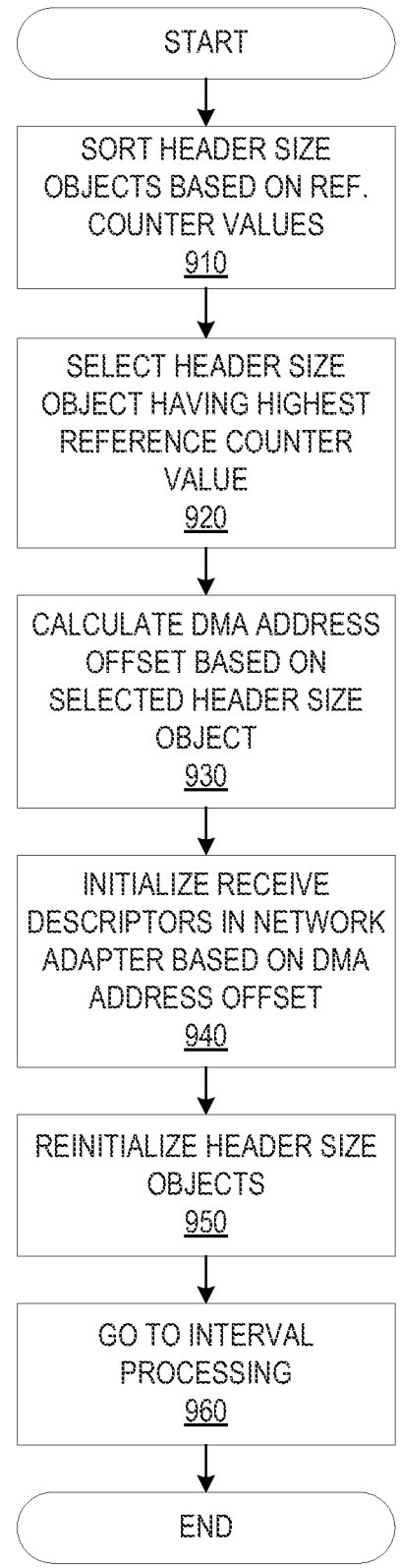
FIG. 9 is a flowchart outlining an example operation for performing end of interval processing in a network adapter device driver in accordance with one illustrative embodiment.

FIG. 9 is a flowchart outlining an example operation for performing end of interval processing in a network adapter device driver in accordance with one illustrative embodiment. As shown in FIG. 9, the operation starts sorting header size objects according to their reference counter values so as to generate a relative ranking of header size objects (step 910). A header size object having a highest reference counter value is selected (step 920). It should be noted that in this step, or as part of the sorting step 910, if multiple header size objects have a same reference counter value, then selection logic may resolve this "tie" in an implementation specific way, e.g., selecting a header size object that was previously selected in a prior interval using a history data structure or the like, selecting a most recently selected header size object for a previous interval, selecting a header size object corresponding to the most recently received frame as may be determined from timestamps stored in the header size object for the last received frames of that particular frame size, or the like, from among the header size objects that have a same reference counter value.

Having selected a header size object, the header size value associated with the header size object is used to calculate a starting DMA address offset (step 930). The calculated DMA address offset is then used to initialize receive descriptors, in the network adapter, for the receive buffers in the cache memory of the host system (step 940). The header size objects in the header size object data structure are then reinitialized for the next interval (step 950). This may involve deleting all of the header size objects in the header size object data structure, resetting counters and/or timestamp entries in, or associated with, these header size objects, or the like. The operation then goes back to interval processing, such as the interval processing example in FIG. 8 (step 960) and the operation terminates.

Thus, the illustrative embodiments provide mechanisms for performing memory transfer optimization of network adapter data placement when performing header-data split operations. As a result of the mechanisms of the illustrative embodiments, the data payload of received frames are stored in receive buffers in a cache-aligned manner by identifying the most frequently encountered header size of received frames during a predetermined interval and using that header size to generate a DMA address offset that is used by the network adapter to perform DMA writes to the receive buffers in the host's cache memory. This minimizes the number of read-modify-write (RMW) operations needed to correctly update data in the cache memory for proper processing by the host system.

As previously mentioned above, the mechanisms of the illustrative embodiments may be implemented on a connection-by-connection bases, or queue-by-queue basis in the network adapter. Thus, each queue may have a different DMA address offset calculated for it using the mechanisms of the illustrative embodiments, which is then used to access the receive buffers associated with that connection. As previously mentioned, the receive network traffic associated with a given connection will tend to be hashed by the network adapter to the same receive queue. Thus, as a result, the header size of the received frames will tend to have less variance for a given queue or connection. Thus, for each queue and network connection, the separately determined DMA address offset will be more accurate than a fixed DMA address offset and will more often result in properly aligned data in the cache memory. This again will result in a minimization of RMW operations in the host system and as a result, greater performance of the host system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a host system and a network adapter, for processing received frames of data over a network connection, the method comprising:
   receiving, in the host system from the network adapter, a plurality of frames of data;
   recording, by the host system, over a current predetermined interval, for each frame in the plurality of frames, a header size associated with the frame;
   determining, by the host system, a receive buffer address offset for receive buffers in the host system for a next predetermined interval based on the recorded header sizes of the plurality of frames over the current predetermined interval; and
   configuring, by the host system, the network adapter to utilize the receive buffer address offset to perform cache-aligned data transfers with the host system.

2. The method of claim 1, wherein determining the receive buffer address offset for receive buffers in the host system for a next predetermined interval comprises:
   selecting a most frequently occurring header size occurring in frames of the current predetermined interval; and
   determining the receive buffer address offset for receive buffers in the host system for a next predetermined interval based on the most frequently occurring header size.

3. The method of claim 2, wherein selecting a most frequently occurring header size occurring in frames of the current predetermined interval comprises determining if more than one header size has a frequency of occurrence that is a most frequently occurring header size, and selecting a header size from the more than one header size having a frequency of occurrence that is a most frequently occurring header size based on a previously selected header size for a previous interval.

4. The method of claim 2, wherein selecting a most frequently occurring header size occurring in frames of the current predetermined interval comprises determining if more than one header size has a frequency of occurrence that is a most frequently occurring header size, and selecting a header size from the more than one header size having a frequency of occurrence that is a most frequently occurring header size based on a most recently selected header size for a previous interval.

5. The method of claim 1, wherein the current predetermined interval and the next predetermined interval correspond to a predetermined number of frames received by the network adapter.

6. The method of claim 1, wherein configuring the network adapter to utilize the receive buffer address offset to perform cache-aligned data transfers with the host system comprises adding the receive buffer address offset to a starting address of all receive buffers that are supplied to the network adapter during the next predetermined interval.

7. The method of claim 1, wherein the network adapter supports multiple receive queues, and wherein the method is implemented on each receive queue in the multiple receive queues separately.

8. The method of claim 1, wherein recording over a current predetermined interval, for each frame in the plurality of frames, a header size associated with the frame comprises, for each frame in the plurality of frames:

determining the header size for the frame;
determining if a header size object is present in a header size data structure associated with the network adapter that corresponds to the header size for the frame;
in response to determining that a header size object corresponding to the header size for the frame is present in the header size data structure, incrementing a counter associated with the header size object; and
in response to determining that a header size object corresponding to the header size for the frame is not present in the header size data structure, creating a new header size object corresponding to the header size for the frame in the header size data structure and incrementing a counter associated with the new header size object.

9. The method of claim 8, wherein determining the receive buffer address offset for receive buffers in the host system for a next predetermined interval comprises:

selecting a most frequently occurring header size occurring in frames of the current predetermined interval based on values of counters associated with header size objects in the header size data structure, wherein the most frequently occurring header size corresponds to a header size object in the header size data structure having a highest counter value; and
determining the receive buffer address offset for receive buffers in the host system for a next predetermined interval based on the most frequently occurring header size.

10. The method of claim 8, wherein the network adapter supports multiple receive queues, each receive queue has a separate associated header size data structure, and wherein the method is implemented on each receive queue in the multiple receive queues separately using the separate associated header size data structures.

\* \* \* \* \*